United States Patent [19]

Nater

[11] Patent Number: 5,438,416
[45] Date of Patent: Aug. 1, 1995

[54] LASER DUAL WAVELENGTH SELECTION SYSTEM

[76] Inventor: Charles Nater, P.O. Box 386, Saratoga, Calif. 95071

[21] Appl. No.: 124,304

[22] Filed: Sep. 20, 1993

Related U.S. Application Data

[63] Continuation-in-part of Ser. No. 831,769, Feb. 5, 1992, abandoned, which is a continuation of Ser. No. 272,596, Nov. 17, 1988, abandoned.

[51] Int. Cl.$^6$ .................. G01B 11/14; H01S 3/00
[52] U.S. Cl. .................. 356/373; 356/375; 372/38
[58] Field of Search ............ 356/372, 373, 375, 380, 356/385–387, 374, 395, 138, 152, 154; 318/560, 561, 457; 250/561, 235, 236; 372/23, 38, 97; 324/96, 97; 235/462, 472

[56] References Cited

U.S. PATENT DOCUMENTS

| | | | |
|---|---|---|---|
| 3,657,792 | 4/1972 | Hug et al. | 356/154 |
| 4,319,845 | 3/1982 | Shuji | 356/375 |
| 4,708,483 | 11/1987 | Lorenz | 356/376 |
| 4,791,304 | 12/1988 | Iida | 250/236 |
| 4,841,135 | 6/1989 | Goto et al. | 250/236 |
| 4,879,671 | 11/1989 | Rieder et al. | 356/373 |
| 4,920,541 | 4/1990 | Baumgartner et al. | 372/23 |
| 5,185,676 | 2/1993 | Nishiberi | 250/236 |

*Primary Examiner*—Richard A. Rosenberger
*Assistant Examiner*—Hoa Q. Pham
*Attorney, Agent, or Firm*—James J. Leary

[57] ABSTRACT

A laser dual wavelength selection system having a resonant galvanometer drive system moving an intracavity reflector as part of a gain cavity and optical grating combination. Sensor 52 provides signals to drive control 54 which in combination with preprogrammed information is used to control the resonant galvanometer actuator in such a manner that sinusoidal operation will provide two at rest positions for every cycle. Laser pulse firing at these two selected times will provide two optimized selected wavelengths per cycle. Bias tuning is used to select adjacent wavelengths in a repetitive sequence.

24 Claims, 13 Drawing Sheets

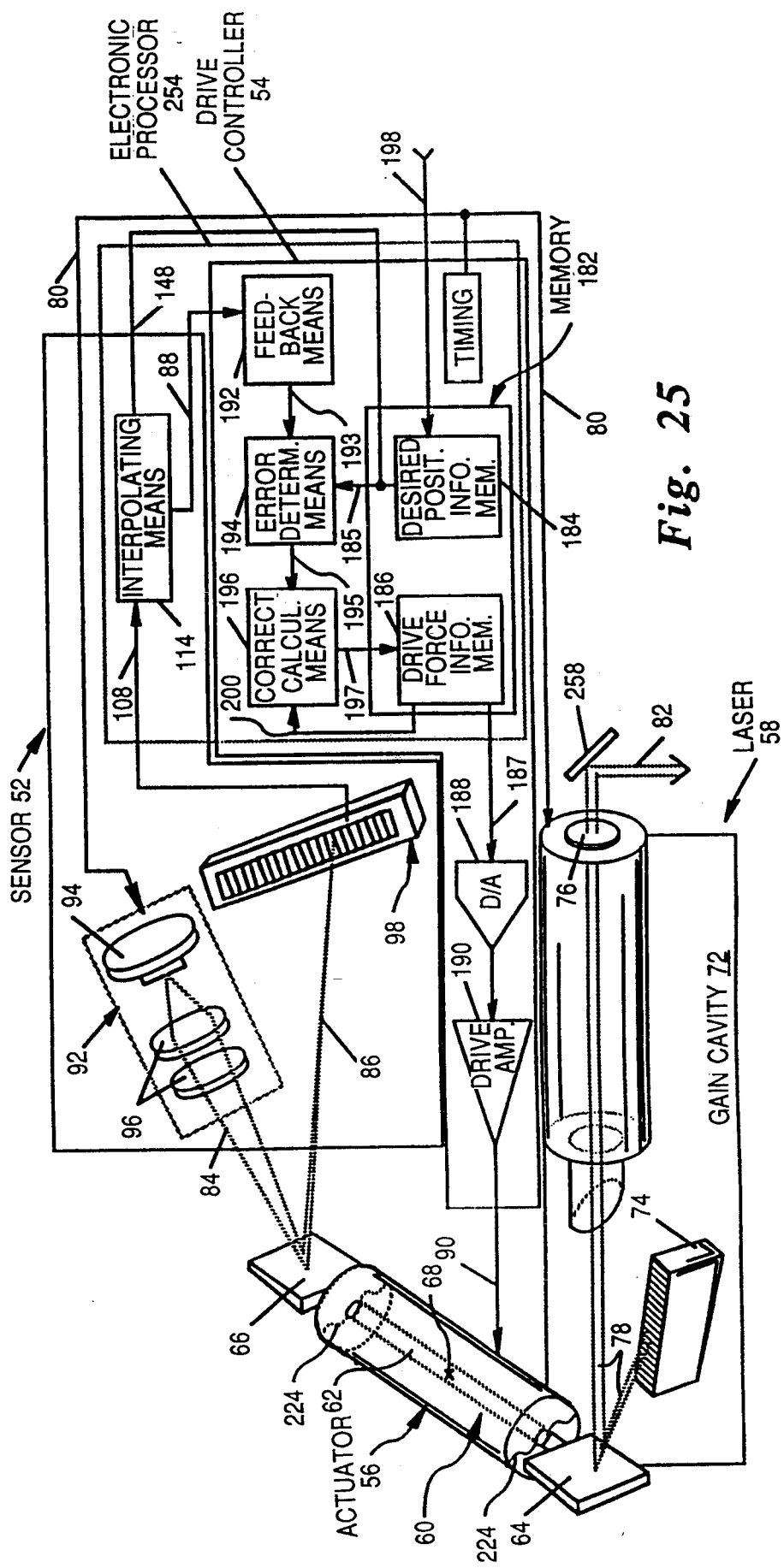

LASER DUAL WAVELENGTH SELECTION SYSTEM

RELATIONSHIP TO OTHER APPLICATIONS

This patent application is a continuation-in-part of patent application Ser. No. 07/831,769, filed Feb. 5, 1992, now abandoned, which is a continuation of patent application Ser. No. 07/272,596, filed Nov. 17, 1988, now abandoned.

BACKGROUND OF THE INVENTION

1. Field of the Invention

The present invention relates to apparatus and methods for selecting laser wavelengths by the use of resonantly moving intracavity elements. A primary objective is to obtain two selected wavelengths with high repetitive accuracy and maximum power output at high repetition rates.

Very high speed wavelength agility is achieved by the use of a resonant intracavity reflective element. With a resonant system, the cyclic frequency can be as short as one millisecond, so two stable selected optimum wavelength pulses can be fired at 500 microsecond intervals, an ideal timing for DIAL LIDAR operation. The features of the invention are applicable to both gas lasers and to some solid state nonlinear materials, used in solid state lasers and optical parametric oscillators (OPO).

2. Description of the Prior Art

Tunable lasers typically include a diffraction grating in the laser gain cavity to achieve wavelength tuning. In some cases an optical parametric oscillator (OPO) material (usually a crystal with highly non-linear optical properties) such as Beta Barium Borate is used. Tunable lasers may be tuned by precisely adjusting the angle of incidence of a laser cavity beam against the diffraction grating (or OPO crystal) in order to control or change the wavelength of light reflected or refracted and thereby tune the frequency of the laser output beam. Grating reflection angles have conventionally been adjusted by grating alignment micrometer screws. Manual micrometer adjustment is slow and severely restricts beam steering agility, and even automated micrometer adjustment by stepper motors is hindered by the angular momentum of the diffraction grating, screw friction, and other forces.

Laser radar (LIDAR) systems can be used to transmit different wavelengths of light into airborne suspensions (such as smog) which have differing reflectivities to the different wavelengths. Each wavelength's reflected light intensity is then measured for remote spectrographic analysis of suspension samples. In remote spectroscopy LIDAR applications it is advantageous to maximize the stability and repeatability of each laser pulse output at each different wavelength. On the other hand, it is very advantageous to minimize intervals between transmitting pulses in order to reduce measurement interference by relative motion between the LIDAR unit, the intervening atmosphere and the suspension sample. Maximum accuracy is achieved by successively transmitting the different wavelengths at the laser's maximum cyclic firing rate, which may vary from ten to hundreds or more of shots per second.

Referring to FIG. 1, laser 10 wavelength tuning rates have conventionally been somewhat increased by using continuously rotating polygonal mirrors 12 which sweep laser cavity beams 14 at different angles across one or more stationary diffraction gratings 16 to successively tune the laser output beam 18 to different predetermined wavelengths. However, the stable tuning capability of a continuously rotating polygonal mirror system is limited because the mirror facets 20 are never stationary. Triggering of laser pulses must be synchronized with the positions of facets 20 to initiate pulses when a facet is passing through the desired angular position corresponding to reflecting the wavelength desired for each pulse. A conventional polygonal mirror system for laser wavelength tuning uses a master clock 22, amplifier 24 and motor 26 to drive a massive polygonal mirror 12 at a constant speed. Clock sensor 28 uses rotation timing pickoff points which, with corresponding signals from desired position information memory 30, are input to delay circuit 32 to control a pulse trigger circuit 34 which triggers the laser pulses.

Referring to FIG. 2, the laser output pulse timing 36 is typically derived from the frequencies of the facet clock signals 38 and of the master clock signals 40 driving the polygonal mirror 12 at a nominally constant rate. Because polygonal mirror facets 20 continue moving as laser 10 is pulsed, continuously varying or smeared wavelengths are reflected from diffraction grating 16 back into the laser gain cell. These varying reflected wavelengths during pulses impose limitations on the laser's peak power and discrimination capability. Continuous rotation of polygonal mirrors degrades laser output pulse uniformity and mode stability, which also affects beam pointing. These effects increase proportionately with polygonal mirror rotation speeds.

Conventional optical element positioning systems are unable to tune lasers repeatably at high rates to high pulse power. High performance for maximum power optical beam tuning requires optical elements in the cavity to be stationary at the critical instant of laser pulse firing and then to jump quickly and precisely to the next position in a sequence which can be dynamically altered in accordance with changes in system operating conditions, which is not feasible with conventional optical element positioning systems.

SUMMARY OF THE INVENTION

It is therefore a primary objective of the present invention to successively reposition an optical element at high speeds and with highly precise repeatability.

It is another objective to sense actual positions of a resonantly movable optical reflector and to represent the positions with high resolution interpolated actual position signals.

It is another objective to successively reposition an optical reflector to steer a light beam in desired directions.

It is another objective to select two desired wavelength outputs by operating an intracavity reflector in a resonant cyclic mode, rotating angularly first in one direction, then reversing a like amount in the opposite direction.

It is another objective to provide an improved tunable laser.

A preferred embodiment of a positioning system according to the present invention includes sensor means, drive control means and actuator means.

Actual positions of a mirror are sensed and resolved by sensor means preferably including lighting means for emitting light to be reflected by the mirror, optical detector means for detecting the intensity distribution of the reflected light and producing an intensity sample waveform, and interpolating means for resolving sample waveform values to provide interpolated actual position values.

The actual position values are fed back to a drive controller preferably including memory means for storing desired position information and drive control information, drive force or mirror position error determining means for determining differences between the desired and actual mirror positions at given times, correction calculating means for correcting and storing drive control information for later use to control an actuator to reposition the mirror closer to the desired resonant positions, and drive amplifier means for amplifying drive control information signals into drive force currents.

Corrected drive force currents are applied to a resonant actuator preferably including a housing with a central bore which supports an elongated armature having opposite ends with equal masses including the mirror and possibly another optical element to balance the armature around its lengthwise center point, a drive coil for exerting drive forces on the armature, and armature return spring means for opposing the drive forces.

Among the advantages of the invention is that reflector positions are sensed frictionlessly and represented as interpolated actual position feedback signals enabling dynamically modifiable positioning control suitable for spectroscopy and LIDAR applications. Once locked onto a repeating pattern of relatively unchanging desired positions, the invention can successively reposition and practically stop the armature at actual positions within for example 1 part in 50,000 of the desired positions at intervals of one-half the resonant period of the armature, thus obtaining two discrete positions per resonant cycle.

These and other objects of the present invention will become apparent to those skilled in the art upon reading the following detailed disclosure of the preferred embodiments as shown in the several figures of the drawing.

IN THE DRAWING

FIG. 25 is a schematic diagram showing details of the FIG. 4 sensor, the FIG. 16 drive control, and the FIG. 22 actuator combined with the FIG. 3 laser.

DESCRIPTION OF THE PREFERRED EMBODIMENTS

System

Figure 1:
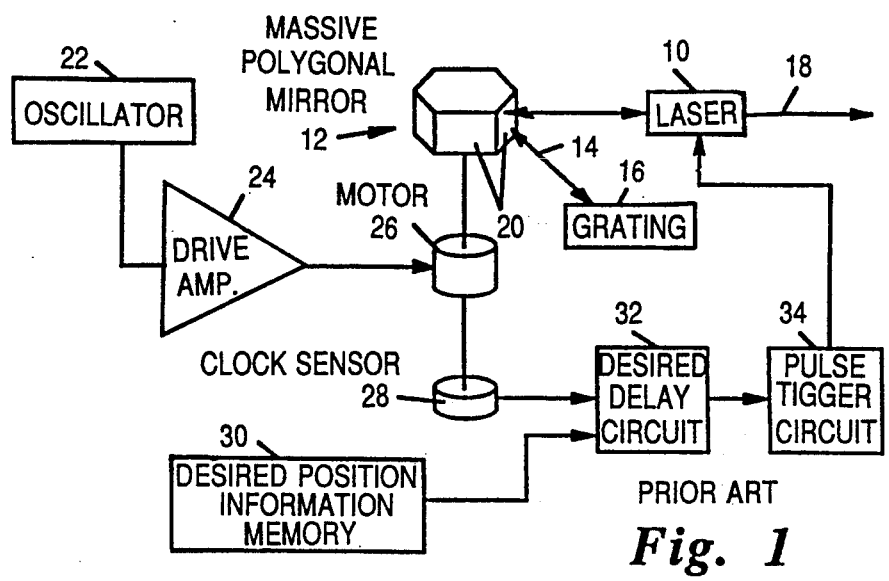
FIG. 1 is a schematic block diagram of a prior art polygonal mirror wavelength tuning system.
Figure 2:
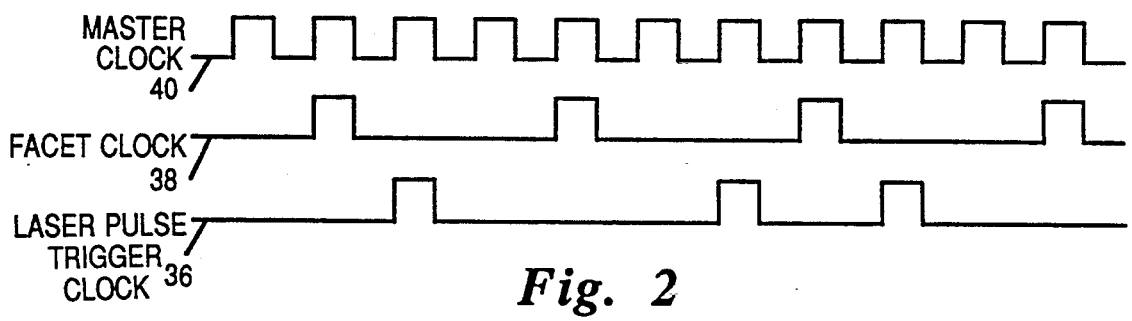
FIG. 2 is a timing diagram for the system of FIG. 1.
Figure 3:
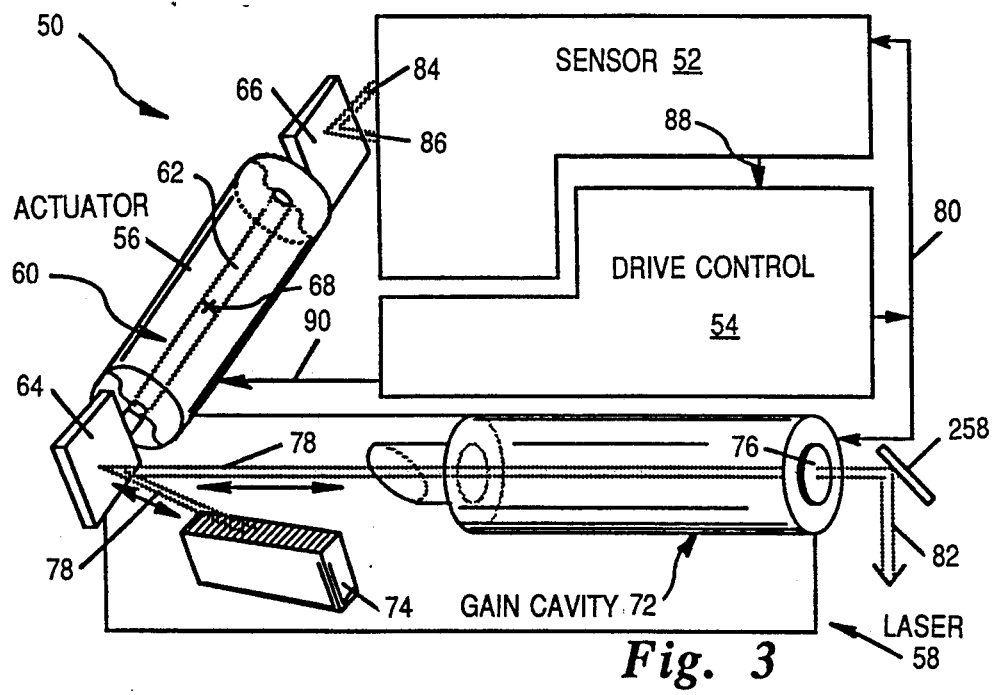
FIG. 3 is a schematic diagram showing the sensor means, drive control means, and actuator means of the present invention in an application with a tunable laser.

Referring to FIG. 3, a positioning system 50 according to the present invention in a preferred embodiment includes a sensor means 52, a drive control means 54, an actuator means 56 and a laser 58.

Actuator means 56 is preferably a galvanometric actuator including a resonantly movable armature 60 formed from an elongated shaft 62 with opposite ends terminating in rigidly connected optical reflectors 64 and 66. The masses of reflectors 64 and 66 are preferably equal to balance armature 60 with its center of mass at shaft centerpoint 68. In system 50 reflector 64 is used as an intra-cavity mirror and reflector 66 is used as a sensor mirror.

Tunable laser means 58 includes a gain cavity 72 formed by intra-cavity mirror 64 and optical diffraction grating 74, and an output beam coupler mirror 76. The cavity mirror 64 orientation defines the state of cavity 72. When laser gain cavity 72 is pumped by a pre-trigger voltage directing an optical beam 78 onto intra-cavity mirror 64, different specific positions of cavity mirror 64 determine which of different specific wavelength of light energy reflect off optical grating 74 to be amplified and, when laser 58 is fired by a trigger pulse on line 80, output through coupler mirror 76 as laser output beam 82. The invention may be used with a range of types of lasers including solid state, excimer, and gaseous lasers in configurations different from that shown in FIG. 3.

The position of intra-gravity mirror 64, by means of its rigid connection to sensor mirror 66, is preferably sensed by sensor means 52 through causing emitted light beam 84 to be reflected off of sensor mirror 66 and to return as reflected light beam 86 to sensor means 52. Sensor means 52 detects the position of reflected beam 86 and responsively produces an "actual position" signal on line 88.

The actual position signal is used as a "feedback signal" by drive control means 54 in executing algorithms to correct a drive force current output on line 90 which drives actuator means 56 to reposition armature 60 and reflector 64 and to thereby re-tune laser 58 as desired.

Sensor

Figure 4:
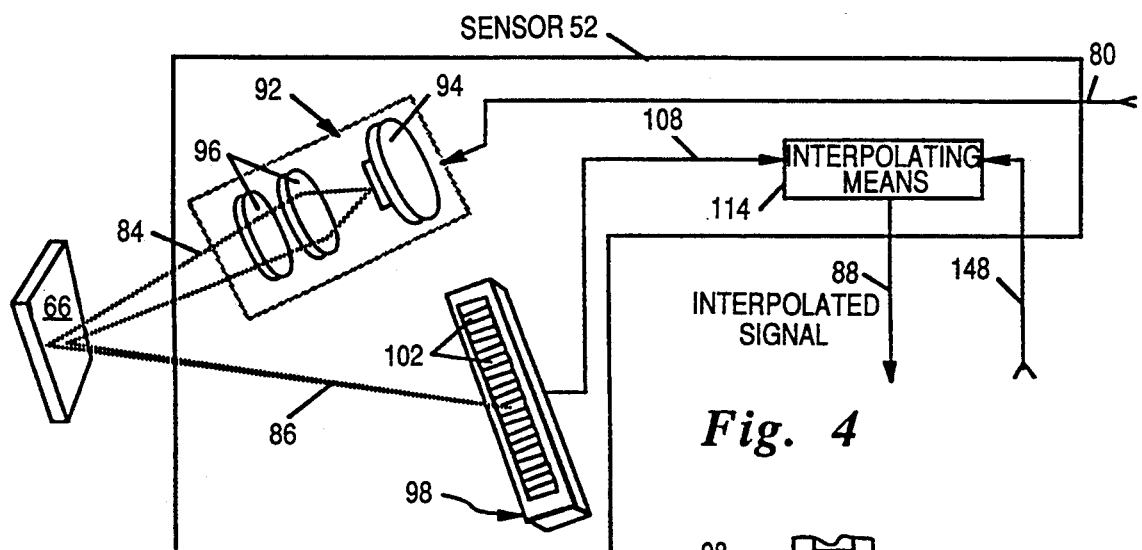
FIG. 4 is a schematic diagram showing details of the sensor means of FIG. 3.

Referring to FIG. 4, the preferred sensor means 52 comprises a lighting means 92 including a suitable illumination source such as an incandescent lamp, a light emitting diode (LED) or preferably a laser diode 94 and a focussing lens 96 which are arranged to radiate and focus a beam of emitted light 84 towards movable optical reflector 66. Emitted light beam 84 impinges upon reflector 66 and, depending on the reflector's angular position, is reflected as reflected beam 86 back towards optical detector means 98.

Figure 5:
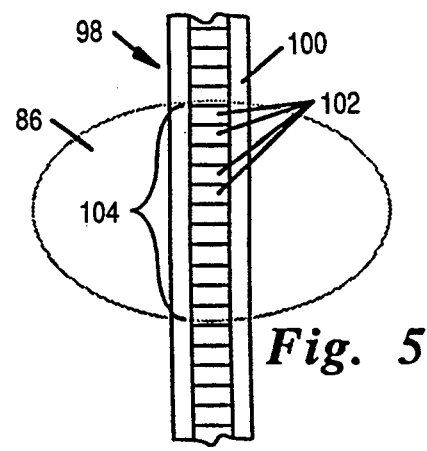
FIG. 5 shows details of the FIG. 4 optical detector means including an array of discrete photodetector elements in an area transiently illuminated by a reflected light beam.

Referring to FIG. 5, the preferred optical detector means 98 comprises an array 100 of for example 2,048 discrete photodetector elements (pixels) such as charge coupled devices (CCDs) 102. Reflected beam 86 is preferably focused to illuminate an area 104 as narrow as possible and perpendicular to the length of array 100 throughout deflections of mirror 66 to always illuminate CCDs 102 in an area 104 somewhere along the array, and to facilitate identifying the beam intensity center point. Area 104 movements along array 100 due to rotations of reflector 66 are preferably monitored by providing a signal on line 80 to energize illumination source 94 to pulse emitted beam 84 at moments of measurement interest. Pulsing beam 84 effectively freezes the mirror 66 position to be sensed with high accuracy at times (such as during lock-up) when the mirror has some finite velocity. If mirror 66 moves relatively slowly around measurement moments (or positions), and if CCD array 100 is scanned at a high rate, then illumination source 94 may emit beam 84 continuously rather than in pulses.

Figure 6:
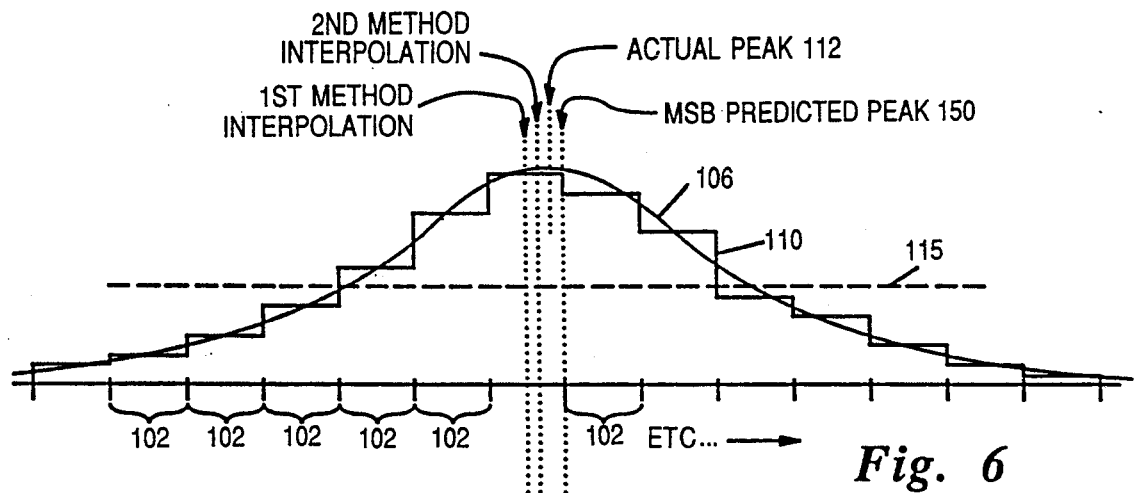
FIG. 6 is a graph showing an intensity waveform of light illuminating certain photodetector elements, a received light intensity sample waveform produced by the illuminated photodetector elements, and a reference level used for thresholding by the circuit of FIG. 7.

Area 104 receives light represented by intensity distribution waveform 106 as a function of distance along the abscissa in FIG. 6, which is detected by illuminated elements 102. CCD array 100 is preferably scanned at a rate in the megahertz range and outputs on line 108 detection signals idealized for example as light intensity sample waveform 110 as a function of time along the abscissa. Illuminated area 104 typically covers more than one pixel 102, and the impinging light intensity waveform 106 is not generally evenly distributed around its actual peak 112. In addition, a sweeping beam 86 focuses differently on areas 104 near the center than on areas 104 near the ends of array 100. Many sensor applications (including LIDAR) require precise sensing repeatability but not necessarily absolute sensing accuracy. To improve beam position sensing resolution and repeatability, the sensing method of the present invention provides interpolating means 114 to implement either a "first" method or an alternate "second" method of interpolating and produce interpolated "actual position" signals on sensor output line 88. Both methods avoid many potential pitfalls in interpolating the actual position of the centroid of light intensity detected in area 104.

Figure 8:
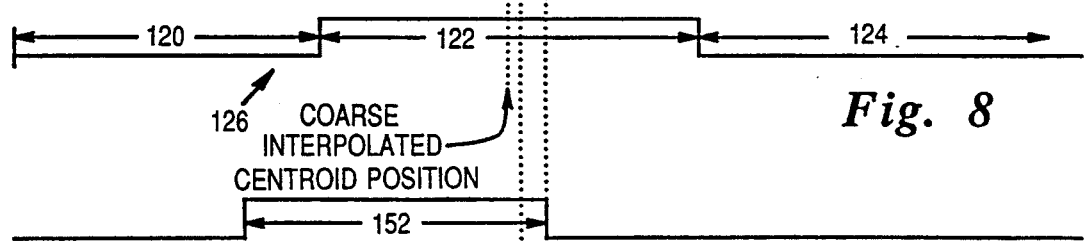
FIG. 8 is a graph of an envelope waveform produced by the thresholding circuit of FIG. 7.
Figure 7:
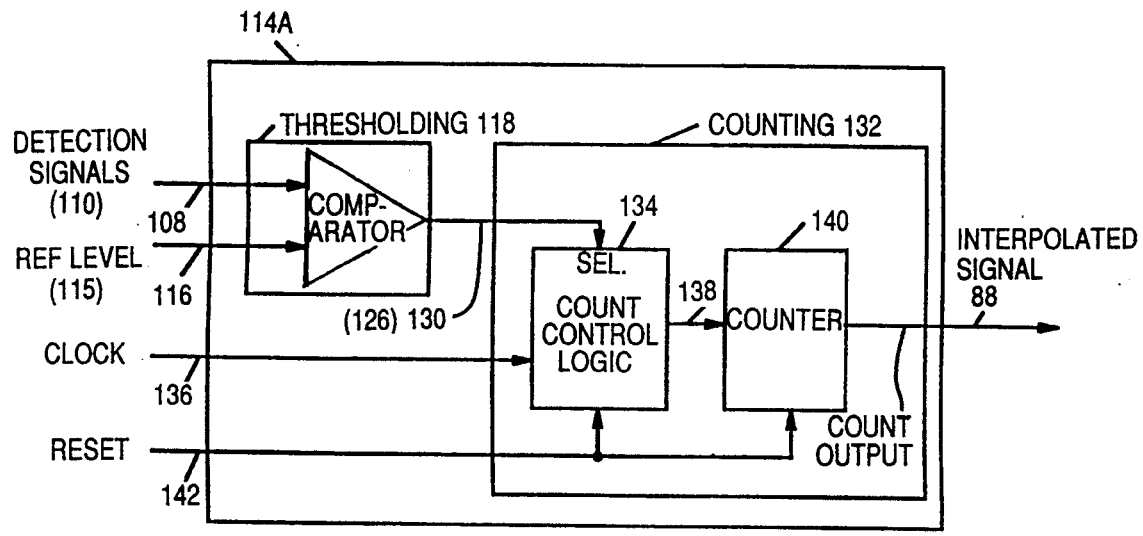
FIG. 7 is a diagram of a thresholding circuit and a counter circuit in a first embodiment of the FIG. 4 interpolating means.

According to the "first? method, interpolating circuit 114a as shown in FIG. 7 uses a reference level voltage 115 (FIG. 6) input on line 116 and a thresholding circuit 118 to "threshold" intensity sample waveform 110 and thereby define three intervals: 120, 122 and 12 forming a binary envelope waveform 126 (FIG. 8) which comparator 128 outputs on line 130. The waveform 126 is received by counting circuit 132 and selects the rate at which count control logic 134 passes (preferably pixel) clock pulses from line 136 through to line 138. Count control logic 134 passes line 136 clock pulses at frequency f during interval 120, passes clock pulses at half frequency f during interval 122, and passes no pulses during interval 124. The line 138 pulses are received and counted by counter 140 which outputs, on line 88, an "interpolated" signal value representing the lengthwise center of waveform 126 interval 122 and hence represents the center of intensity sample waveform 110, independently of the width in pixels of illuminated area 104. As long as reflected light beam 86 illuminates an area 104 somewhere along array 100, this "first" method is convenient for producing coarse accuracy interpolated position signals and does not require predicted centroid position information. Both count control logic 134 and counter 140 are reset by a reset signal on line 142 before each time a detection signal waveform 110 is read out from CCD array 100.

Figure 10A:
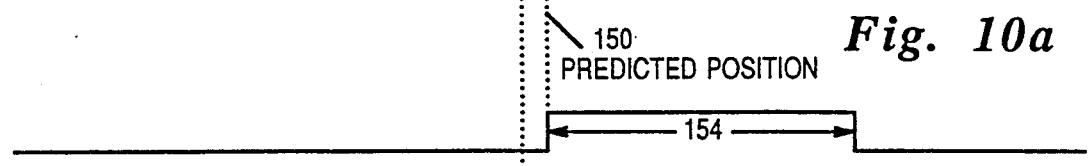
FIGS. 10a, 10b and 10c are three waveforms showing, for the FIG. 9 summing circuit, (a) a leading interval before a predicted centroid position, (b) a lagging interval after a predicted centroid position, and (c) the integrated sum signal.
Figure 10B:
Figure 10C:
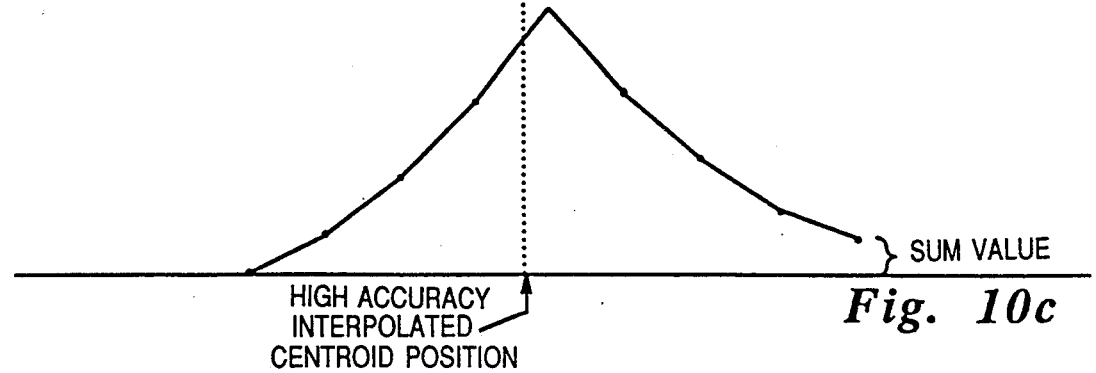
Figure 9:
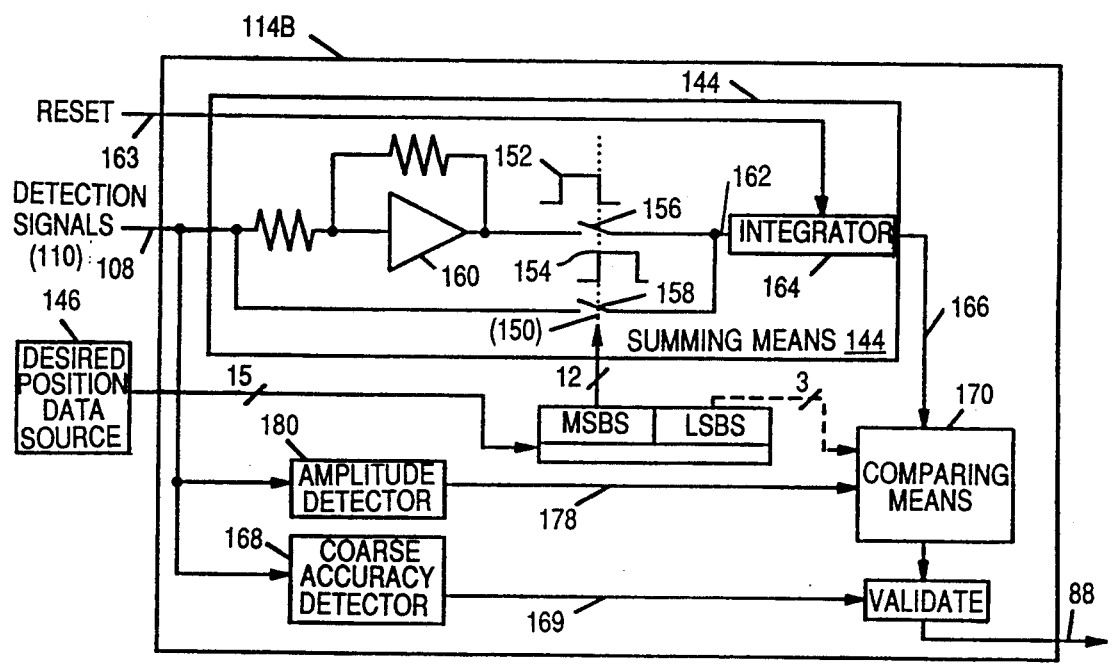
FIG. 9 is a diagram of a summing circuit used in a second embodiment of the FIG. 4 interpolating means for producing a sum signal.

According to the "second" method, interpolating circuit 114b as shown in FIG. 9 uses a summing circuit 144 and a desired position data source 146 connected through input line 148 to provide desired position data signals, the MSBs of which are used as a predicted intensity centroid position 150. Summing means 144 generates a leading interval integration timing pulse 152 (FIG. 10a) of a certain duration preceding position 150 and generates a lagging interval pulse 154 (FIG. 10b) of equal duration following position 150, and applies pulses 152 and 154 to switches 156 and 158 to connect line 108 detection signals, inverted by invertor 160 or uninverted, to line 162. Integration timing pulse widths 152 and 154 are not critical but must be sufficient wide that sample waveform 110 falls off significantly in amplitude at its edges. Normally, one half of the CCD output pulse width at the half power points is satisfactory. Pulses too wide introduce excess noise. Integrator 164 integrates the intensity of light detected on both sides of predicted position 150 to output on line 166 a sum signal having a value roughly proportional, depending on the width of integration pulses 152 and 154, to any difference between the areas under waveform 110 before and after predicted centroid position 150. Deviations between the predicted and actual positions cause proportional inequalities between the two area integrals. If the two areas are equal, the predicted centroid position 150 coincides with the actual centroid position, and the output line 166 sum signal value is zero.

Integrator 164 also outputs a zero value sum signal when the actual centroid position is so far off the predicted position 150 that detected waveform 110 peak 112 is entirely missed by integration pulse intervals 152 and 154, since presumably no reflected light illuminates area 104 around the predicted centroid position. In this case the line 166 sum signal is not a meaningful interpolation. Therefore, this "second" method needs a supplemental position signal input on line 169 from a coarse accuracy detector 168, such as a simple thresholding circuit coupled to a pixel counter or interpolating circuit 114a of the "first" method, to confirm the validity of interpolated position signals. When the supplemental coarse accuracy position is within a suitable range of, say, four pixels from the predicted position 150, then the second method is approved to interpolate the actual position of the intensity centroid. Otherwise, and typically during loop closure, when the predicted position 150 is outside the suitable range from the coarse accuracy position, then the coarse accuracy position signal itself is taken as the "interpolated" position signal. The coarse accuracy detector output signal preferably becomes part of the actual position signal on line 88 for interpretation by a drive controller 54 or other utilizing means. Integrator 164 must be reset by a reset signal input on line 163 before each use.

The memory 146 desired position data resolution typically exceeds the CCD array length in pixels 102 or resolution elements which are to be made up by the second method of interpolation. For example, if the desired position data signal is 15 bits, then the 11 most significant bits (MSBs) may represent the predicted pixel location 150 in a CCD array of 2048 pixels 102, leaving the 4 least significant bits (LSBs) to be interpolated to represent the actual centroid location within the predicted pixel. It is not, however, necessary that the MSBs of the desired position signal correspond to the pixel resolution of CCD array 100. For example, again with a 2048 pixel CCD array and a 15-bit desired position data signal, the 12 MSBs could be used to predict the centroid position 150 within half-pixel intervals, leaving the remaining 3 LSBs to be interpolated to make up a 15-bit actual position signal.

When confirmed by the coarse accuracy position signal, the second method of interpolating is completed by comparing means 170 implementing either of version "a" or version "b" of completion to yield highly precise comparisons between the desired and actual positions of the detected light intensity centroid position.

Figure 11:
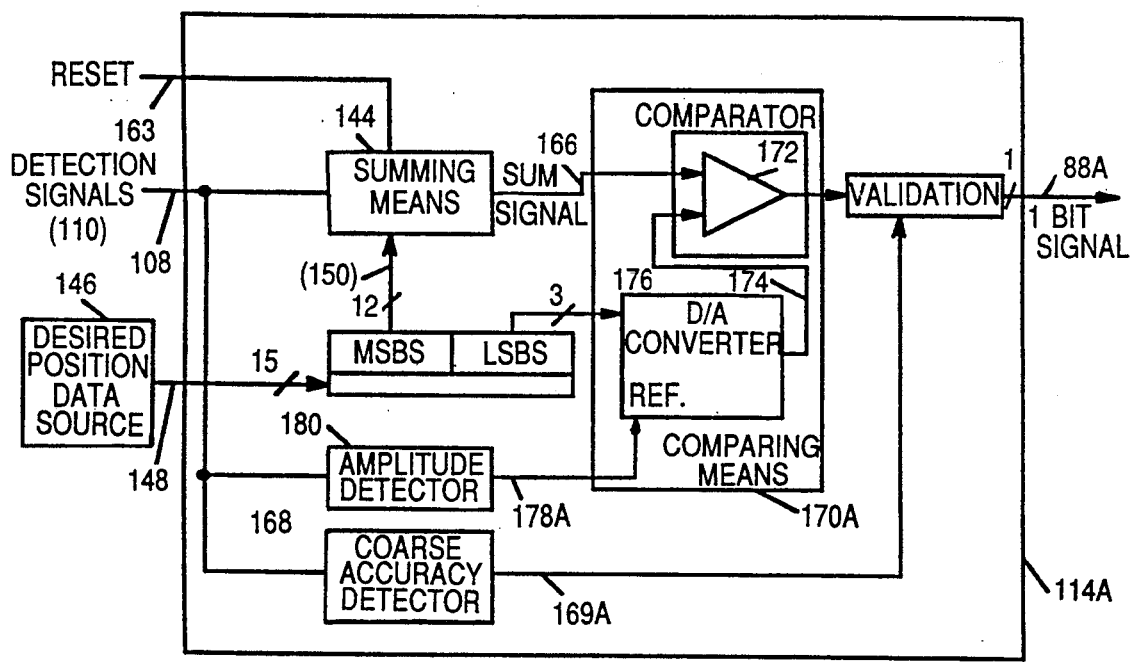
FIG. 11 is a diagram showing the FIG. 9 summing circuit and desired position data source used with a comparator circuit in version "a" of the second embodiment of the interpolating means for providing one-bit interpolated signals.

Referring also to FIG. 11, in the second method with completion version "a," comparing means 170a uses comparator 172 to compare the line 166 sum signal against a line 174 voltage derived by D/A converter 176 from the LSBs of the desired position data signal to produce a 1-bit greater-than/less-than interpolated actual position signal on output line 88a. The D/A converter 176 gain is preferably set by a reference signal (scaled to the reflected light intensity in area 104) received on line 178a from an amplitude detector 180. Amplitude detector 180 detects the peak 112 of intensity sample waveform 110 to represent its amplitude as the reference signal on line 178a. Amplitude detector 180 is optional if the detected CCD pulse 110 height is constant.

Figure 12:
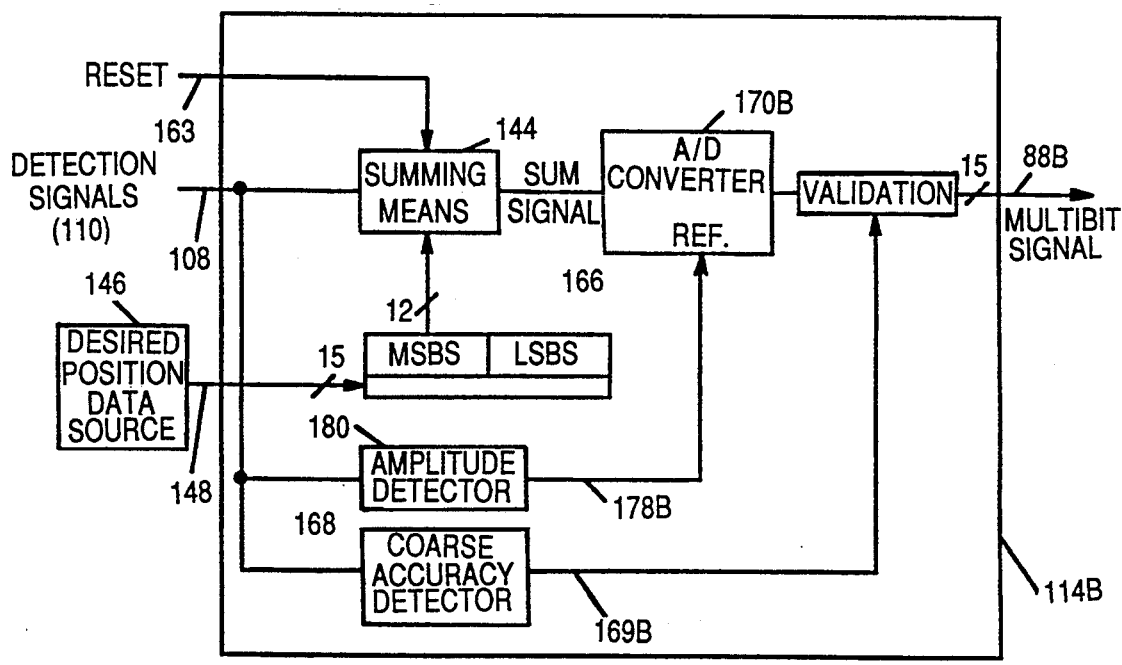
FIG. 12 is a diagram showing the FIG. 9 summing circuit and desired position data source used with an analog-to-digital converter circuit in version "b" of the second embodiment of the interpolating means for providing multiple-bit interpolated signals.

Referring to FIG. 12, in the second method with completion version "b," comparing means 170b uses an A/D converter (optionally scaled by a similar gain reference signal received on line 178b from an amplitude detector 180) to convert the line 166 sum signal into a multiple-bit interpolated signal on output line 88b. Version is equivalent to extending version "a" to output multiple-bit interpolated signals. The interpolated signal quantifies the actual centroid position's departure from the predicted position.

The interpolated actual position signals output on lines 88a (including coarse accuracy detector signals on lines 169a) in FIG. 11 and lines 88b (including lines 169b) in FIG. 12 are used or interpreted slightly differently (e.g. by drive controller 54). Once confirmed by the coarse accuracy position detector, the FIG. 11 interpolated signal output on line 88a can only be used to increment or decrement the corresponding position drive forces by a small amount. In contrast, the FIG. 12 interpolated signal output consists of the MSB predicted position value plus interpolated LSB values which enables larger corrections in drive forces and faster loop closures.

Figure 13:
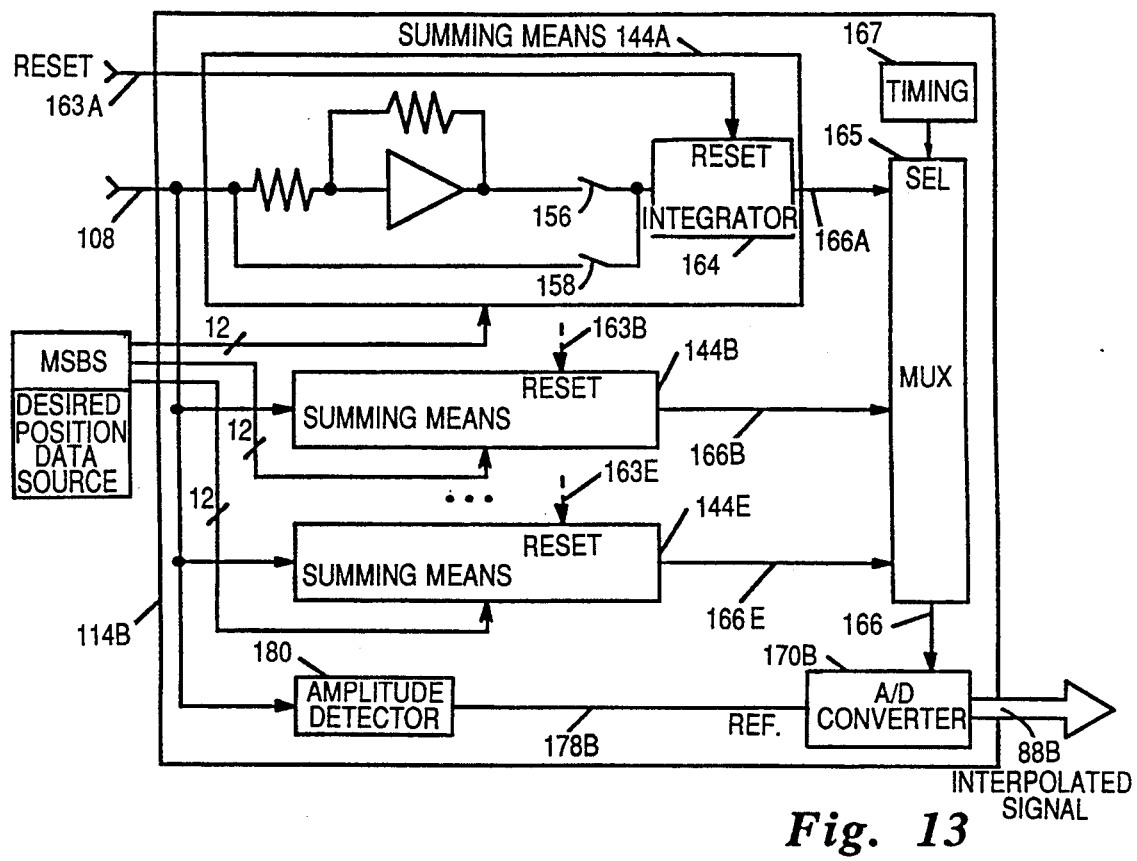
FIG. 13 is a diagram showing the FIG. 9 summing circuit and desired position data source used with an analog-to-digital converter circuit alternately usable in version "b" of the second embodiment of the interpolating means.
Figure 14:
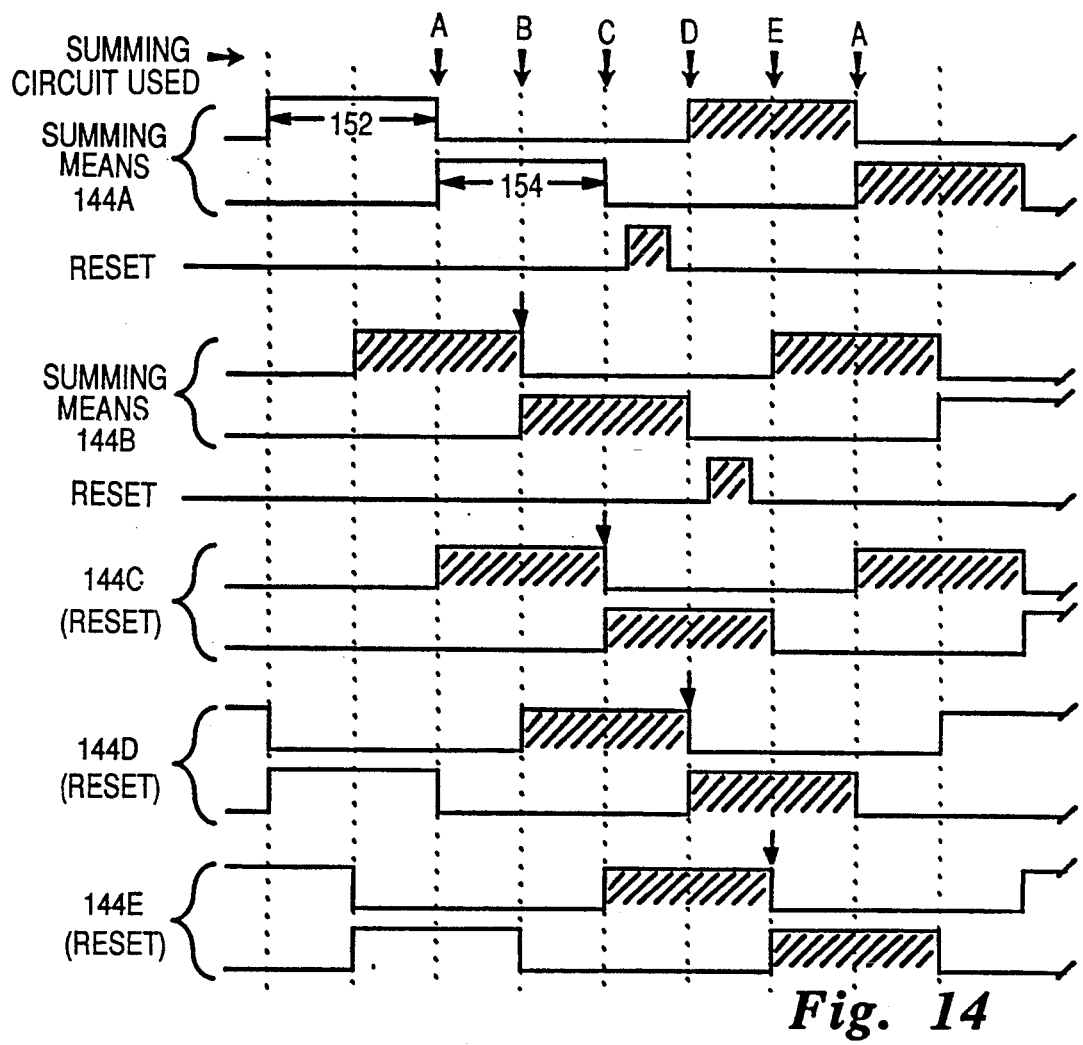
FIG. 14 is a timing diagram for an example FIG. 13 circuit.

Referring to FIG. 13, completion version "b" in a less preferred embodiment includes a multiplexer 165 with a timing source 167 and successively uses one (144) or more (144a, 144b, 144c, etc.) summing circuits assuming different predicted centroid positions. The number of summing circuits 144 depends upon the width of the integration timing pulses 152 and 154 and upon the width of pixels 102 in an area 104 illuminated by reflected beam 86. There must be enough summing circuits so that as the desired position MSB predictions initiate each successive summing means, a new summing means will complete its integration, be reset and be available to assume the next predicted position. FIG. 14 shows a case where integration pulses 152 and 154 are each two pixels wide and five summing means 144a through 144e are used. Summing means 144a needs five (preferably pixel) intervals to integrate a sum signal and be reset before being used again, which necessitates four other summing circuits 144. Since in the embodiment of FIG. 13 all possible interpolated position signals are available, a trivial inspection determines which interpolated signal is most meaningful and should be taken for the output signal. This embodiment produces multiple-bit precision interpolated actual position signals without depending upon validation equivalent to using the "first" method and independently of the magnitude of error in assuming any one predicted centroid position.

Practically, interpolated actual position signal precision or resolution hinders measuring reflector 66 positions beyond accuracies of 1 part in 10E4 or 10E5 because of:

1) the finite size of reflected beam 86;
2) the focal depth-of-field of focussing means 96;
3) light scattering in optics 96 and CCD array 100; and
4) the length in pixels 102 of contemporary CCD arrays 100.

For instance, to provide 32K elements of resolution in a CCD array of length 2K pixels, each pixel must have 16 elements of resolution. Further, if the CCD output energy sample waveform 110 spreads across 4 pixels, interpolation within 64 system elements is required.

Drive Control

Figure 15:
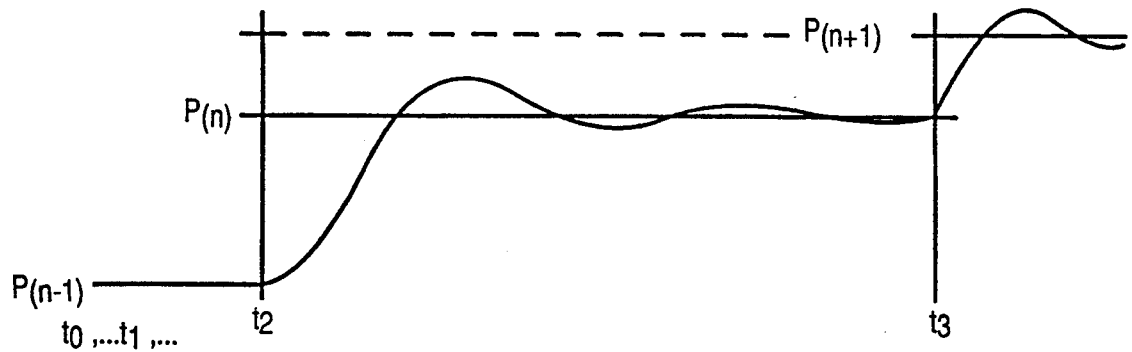
FIG. 15 is a reflector position waveform which could be produced by a conventional servo loop closure technique.

An armature or optical reflector (mirror) could be moved to a stationary position by using a conventional feedback servo loop to monitor the actual position of the armature and to indicate whether, for a desired armature position as shown in FIG. 15, armature drive forces should be continuously increased or decreased until the difference between the desired and actual positions becomes tolerably small. Conventional feedback positioning techniques have typically been speeded up by using lead-lag networks to circumvent resonance effects at high loop gains necessary for accurate loop closure, but since it is impractical to drive actuators to respond in times briefer than intervals related to an armature's resonant period, conventional techniques have been obliged to wait through successive resonant periods to adjust drive forces to close an armature's actual position towards a given desired position, by comparing current position to a memorized target position.

A sophisticated conventional feedback positioning algorithm could conceivably control an actuator to move an armature within intervals of several resonant periods to actual positions within 0.1% of desired positions. Conventionally moving an armature to an actual position within 0.002% of a desired position could require ten, twenty, or more resonant periods. A conventional feedback positioning system operating at this low speed would be marginally satisfactory for tuning lasers at slow rates of several pulses per second, and wholly unsatisfactory for tuning at faster rates of tens or hundreds of pulses per second as desired in LIDAR applications.

Because oscillations at resonance are hard to control, conventional wisdom discourages operating motors or actuators around their resonant frequencies, especially where precise positioning is required. Resonant movements resist real-time closed loop control. A loop closure technique which is re-initiated for each successive new position to which an actuator is to be moved would not be concerned with whether the actuator will later or periodically be required to move the armature between the same two positions.

Drive controllers according to the present invention use delayed feedback corrections and take advantage of relatively unchanging patterns of "n" positions being repeated in cycles C(N), C(N+1), etc. to operate as essentially "n" separate parallel but overlapped feedback loops. This invention regulates resonant operation of an armature and ensures positioning repeatability while optimizing armature position transition speed in concurrently locking a loop to drive a load-armature to stop at each of the "n" positions at half-periods of the load's resonant frequency, namely two positions per resonant cycle.

Figure 16:
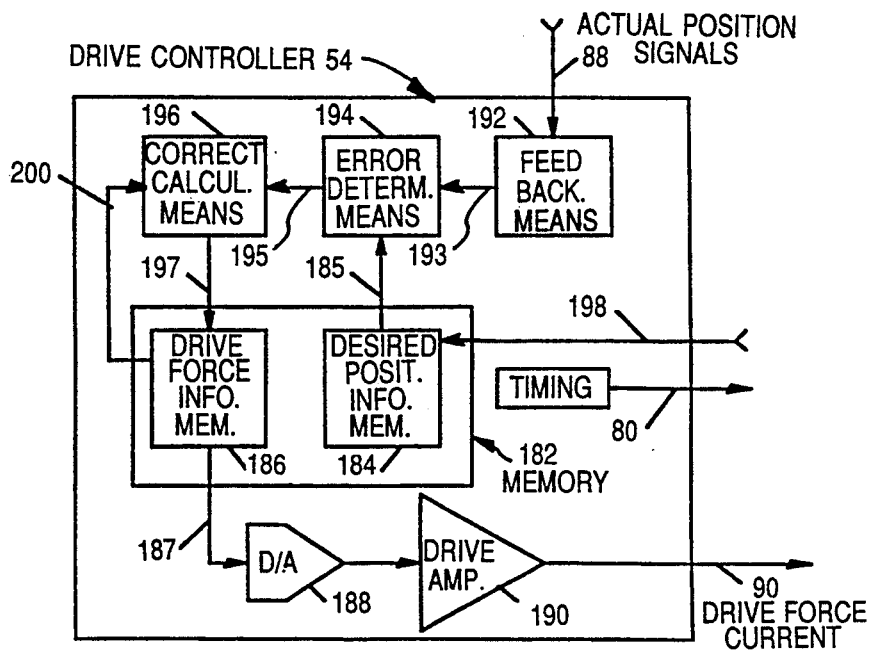
FIG. 16 is a schematic diagram showing details of the drive control means of FIG. 3.

Referring to FIG. 16, the preferred drive controller 54 comprises a memory means 182 including a desired position memory 184 and a drive memory 186, digital-to-analog (D/A) converter 188, drive amplifier 190, drive current output line 90, feedback means 192, actual position error determining means 194 and position correction calculating means 196. Error determining means 194, correction calculating means 196, memory 182 and D/A converter 188 are preferably implemented in digital circuitry, although alternate embodiments may use analog processing and storage circuitry. Through input line 198, desired position memory 184 initially or dynamically receives and stores information defining a selected sequence of one to any practical number "n" of positions P(1), P(2), . . . , P(n) to which a resonantly movable load (preferably rotary armature 60, or alternately a linear armature) is desired to move and pause. Drive memory 186 stores drive force information for output as drive control signals on line 187, conversion by D/A converter 188 and amplification by drive amplifier 190 to produce drive force currents on output line 90 for driving a load.

Actual load position signals are received on input line 88 through feedback means 192 and line 193 by position error determining means 194. Actual position signals are preferably provided by sensor means 52, but could alternately be provided by resistive, capacitive, inductive, or other types of optical or non-optical sensors. Error determining means 194 also receives correlated desired position signals on line 185 from memory 184 from which it determines the error or difference between the actual and desired positions of the load-armature at predetermined measurement instants, and outputs a position error signal on line 195 to position correction calculating means 196. Correction calculating means 196 also receives, on line 200 from memory 186, the corresponding drive control signals which were used to drive the load to that actual position, and uses the position error and drive control signals in algorithms which model the load's response to drive forces to calculate corrections to the drive forces for later moving the load closer to the desired position. In contrast to prior art feedback positioning methods, the present invention does not attempt to refine the actual position of an armature in any one pass through a given position. Calculating means 196 writes corrected drive force signals through line 197 to memory 186 for use during the succeeding cycle "C" of movements through the pattern of positions to drive the load closer to its desired position.

Figure 17A:
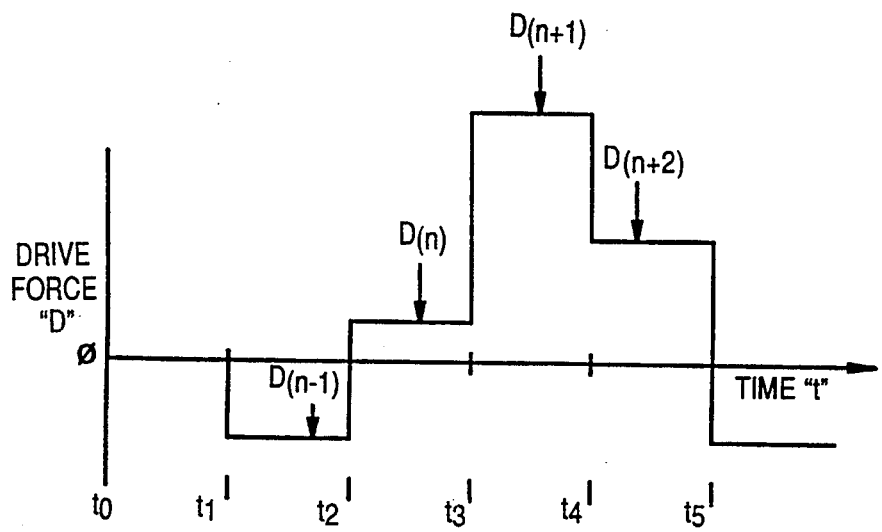
FIGS. 17a and 17b illustrate (a) a step drive force waveform for moving a load along (b) a position waveform which momentarily stops in randomly selected positions.
Figure 17B:
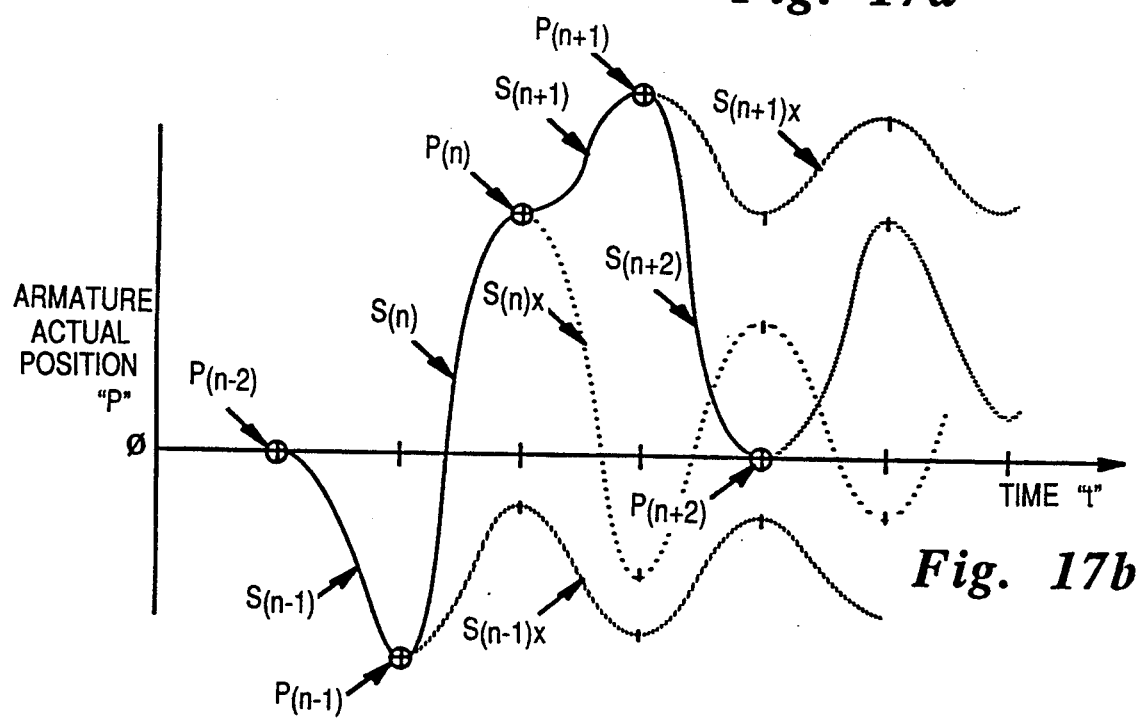

Referring to FIGS. 17a and 17b, the drive method is based on the principle that it is possible to generate a step drive force waveform "D" which will drive a given mechanically resonant load to trace out a desired position sequence waveform "P" and stop at successive desired positions P(1), P(2), . . . , P(n) at intervals of half of its resonant period. For example, assuming that at time "T"=t0, drive force D, load velocity "V" and load position P all equal zero, then from zero velocity in position P(n−2) at time T=t1 a step drive force D(n−1) causes the load to move along position curve segment S(n−1), and unless disturbed to continue moving further along that position curve's dashed line extension S(n−1)x in accordance with the solution of the classical second order differential equation for damped sinusoidal motion:

$$P(t) = \text{old pos.} + \text{pos. change(steady state)}(1 - e^{-at} \cos(bt + \phi))$$

wherein "t" is time; "a" is related to a damping factor; "b" is the damped resonant frequency; and phi is a small phase shift related to damping. This equation's accuracy of fit to load motion is relatively uncritical since the drive method of the present invention takes advantage of the stability of substantially unchanging patterns of positions on successive cycles C(N), C(N+1) etc. to refine each desired position's respective drive force D(n), D(n+1), etc. to close the loop with high precision to the pattern of desired positions. Zero velocity points P(n−1), etc. (having a zero slope on position curve P) lag the application of respective step drive forces D by constant resonance-dependent intervals independent of respective step drive force magnitudes. Thus, a single appropriate level step drive force such as D(n−1) applied at time t1 will move a load to arrive at any desired position such as P(n−1), ideally with zero terminal velocity, at time t2. "Zero" rise time drive force currents or alternately more complex drive currents (not shown) may be used. Starting position P(n−2) is shown as a reference zero position, but could be anywhere.

At time t2 the load-armature has velocity V=0 at point P(n−1), which is equivalent to the load-armature beginning from a stationary position for which the single-step drive force response equation is presented above. Application of step drive force D(n) displaces the load-armature to move along position curve segment S(n) (and unless disturbed to continue moving further along its extension curve S(n)x). At time t3 the load-armature reaches velocity V=0 again at point P(n), another randomly selected point equivalent to the load-armature having been stationary. Then, application of a step force D(n+1) similarly deflects the load-armature to follow position curve segment S(n+1) to position P(n+1) at time t4 (and unless disturbed to continue following its extension curve S(n+1)x). Next, application of drive force level D(n+2) deflects the load-armature to follow position curve segment S(n+2) and to arrive at time t5 at a position P(n+2), which is equivalent to starting position P(n−2), thereby completing a pattern of four positions. Information defining drive force levels D(n−1), D(n), D(n+1) and D(n+2) can be stored in drive memory 186 (FIG. 16), and used in later cycles C(N+1) etc. to repeatedly pass the load along position waveform segments S(n−1)+S(n)+S(n+1)+S(n+2). If the resulting actual positions P(n−1), P(n), P(n+1), and P(n+2) happen to be precisely the desired positions, the respective drive forces D would not need to be updated for passes in later cycles C(N+1), etc.

Since the armature achieves a nominally zero velocity each one-half of its resonant period, at those points it is possible to insert a holding interval of any duration by using appropriate drive force values, allowing armature repositioning at other than twice its resonant frequency while remaining within the spirit of the invention.

Specific Drive Algorithm

Figure 18:
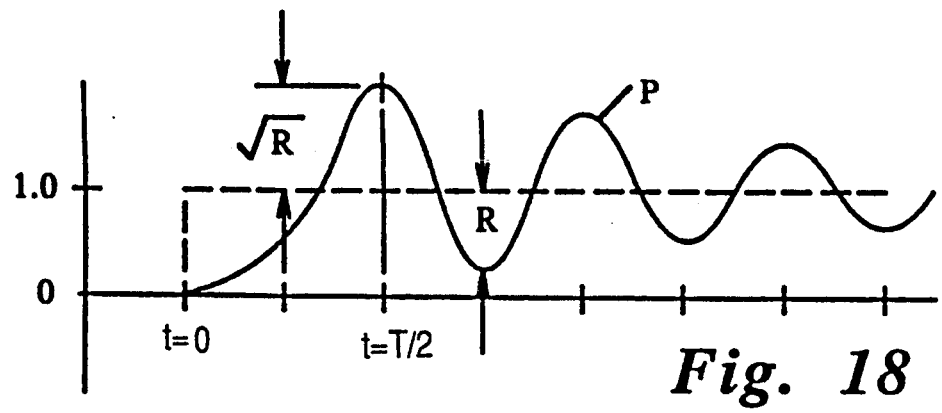
FIG. 18 is a graph illustrating the response of a load to application of a positional equivalent step force waveform.

A load such as actuator means 56 transforms drive forces into angular (or in alternate embodiments linear) armature positions by transformations whose specifics depend upon the specific type of load. The load positioning algorithm can be explained independently of specific actuator embodiments by defining a "position equivalent drive" referring to drive forces in the position domain as transformed by the low frequency (non-resonant) transfer function. Thus a hypothetical one ampere drive force causing a one degree result after oscillations damp out is denoted a "position equivalent drive" of one degree. Referring to FIG. 18, in an example load's positional response to application of a step force: a) the "positional equivalent" of a unity step drive force is position level 1.0; b) the load-armature's resonant half period is T/2, the delay until the load reaches its first zero velocity; and c) the oscillation amplitude after one resonant period is "R," which is related to the system Q and is anticipated to be in the range of 0.9 to 0.99. It then follows from the damped motion equation above that the position waveform P amplitude is (sq.rt.) R above position level 1.0 at the time of the first zero in velocity.

Figure 19:
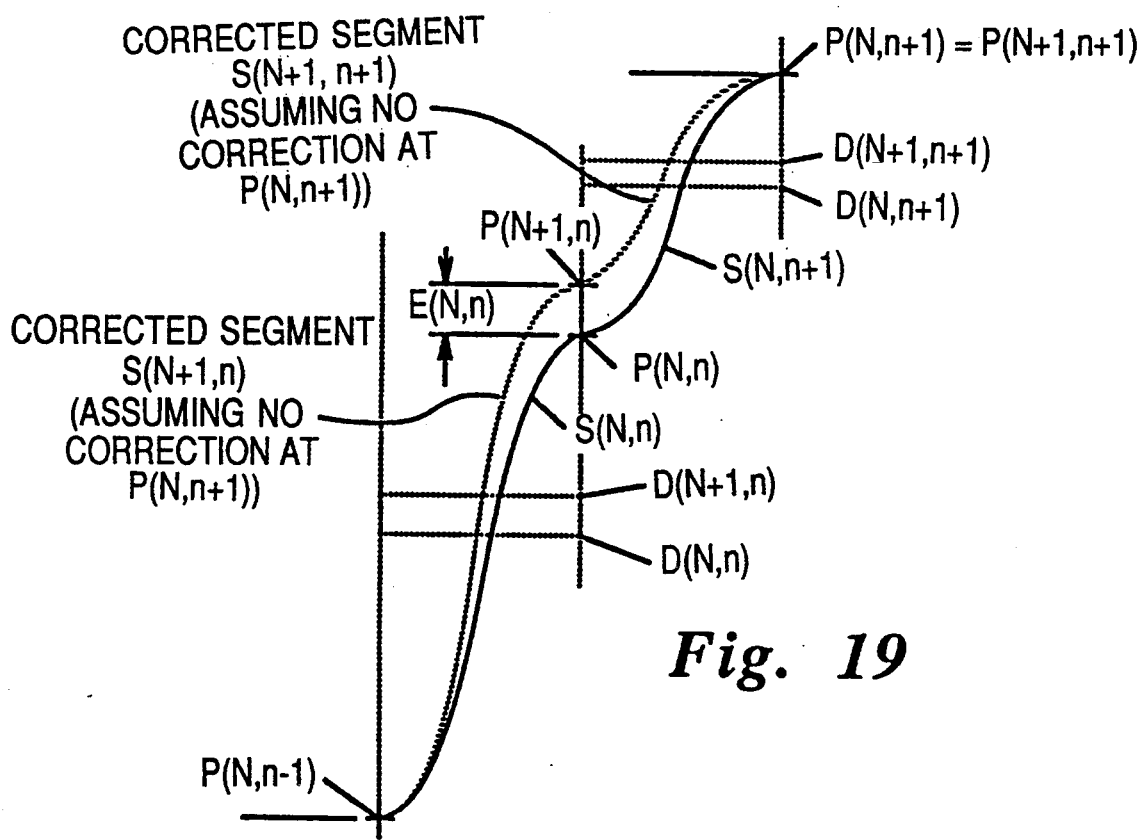
FIG. 19 shows how position errors in segments of a load position curve may be corrected individually and concurrently by the drive means of FIG. 16.

Referring to FIG. 19, an error E(N,n) determined in pass C(N) through a position P(N,n) is reduced by correction calculating means 196 first correcting the positional equivalent drive function D(N+1,n) for driving the load in succeeding cycle C(N+1) to position P(N+1,n), and then compensating the drive force D(N+1,n+1) for the following position P(N+1,n+1) in the succeeding cycle C(N+1) when damped sinusoidal position curve segment S(N+1,n+1) will depart from a different (the corrected) position P(N+1,n) but (not yet having detected any position P(N,n+1) error E(N,n+1)) curve segment S(N+1,n+1) is not to end at a different position (at least as a result of correcting position error E(N,n)).

Referring to FIG. 18 and using the position equivalent drive step magnitude relation to the position of the first zero slope on position curve P, the change in drive force D(N,n) needed to correct an error E(N,n) at the first zero slope can be determined as E(N,n)/(1+sq.rt.R). Thus in FIG. 17, a drive change of E(N,n)*(1/(1+sq.rt.R)) will cause the load on its next pass C(N+1) to follow position curve segment S(N+1,n) and thereby reduce the positional error E(N+1,n) at position P(N+1,n) nominally to zero.

Since position curve segment S(N+1,n+1) on next pass C(N+1) will start a distance E(N,n) above the point P(N,n) where it started on current pass C(N), step drive force D(N+1,n+1) needs to be compensated. Again referring to the ratios of FIG. 18, an error E(N,n) in the starting position requires a drive change of E(N,n)*(sq.rt.R)/(1+sq.rt.K) to arrive at the same next position at P(N+1,n+1). Thus in FIG. 19, drive D(N,n+1) needs to be increased by an amount E(n)*((sq.rt.R)/(1+sq.rt.R)) so that on next pass C(N+1) segment S(N+1,n+1) will still end at the same position P(n) where it ended on current pass C(N). These two changes, the correction to drive function D(N+1,n) and the compensation to drive function D(N+1,n+1)) complete the correction for error E(N,n) at P(N,n) and ideally will make the position error zero on the next pass independent of errors and their corrections at points P(N,n−1) and P(N,n+1).

With compensation for the present position error E(N,n) correction and preceding error E(N,n−1) correction, the total change in terms of positional equivalents for step drive force D(N+1,n) is thus:

E(N,n−1)*((sq.rt.R)/(1+sq.rt.R))+E(N,n)*(1/(1+sq.rt.R))

Figure 20:
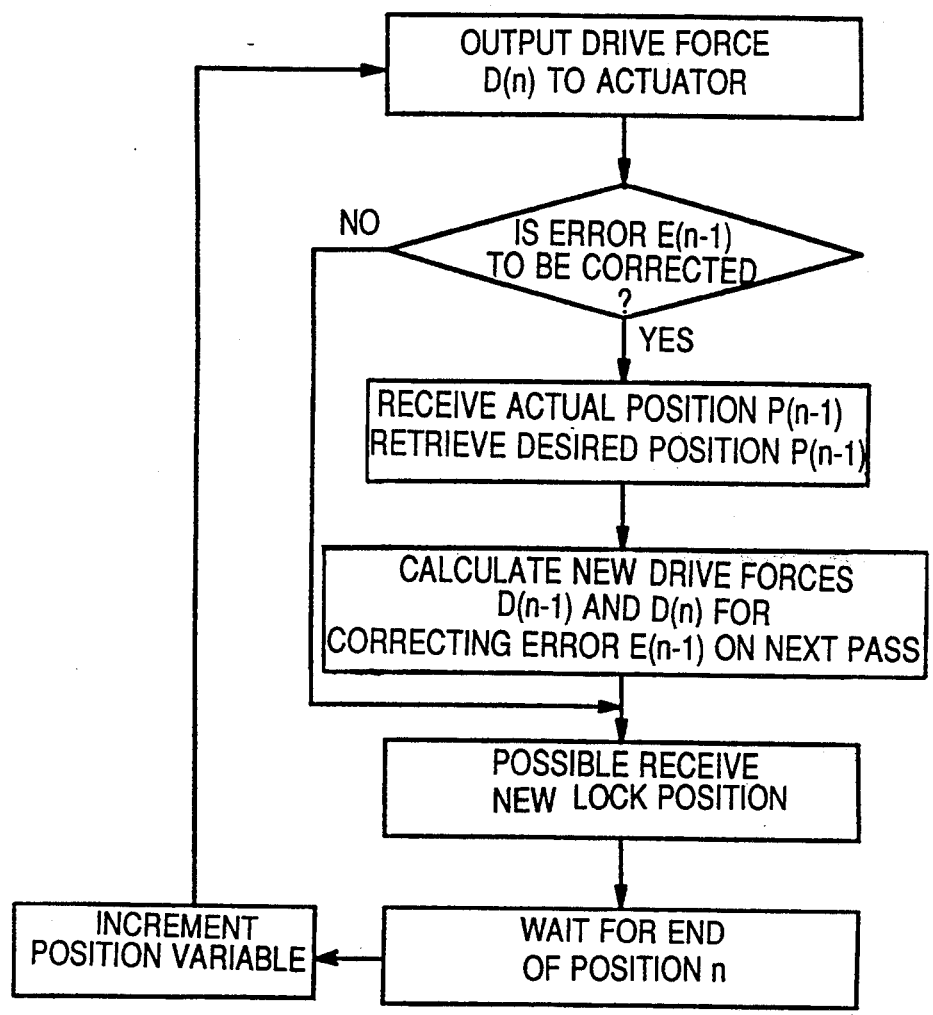
FIG. 20 is a flowchart of the preferred drive method.

The flowchart of FIG. 20 summarizes steps in this preferred drive control algorithm.

In circumstances where the above-presented differential equation for damping poorly fits the step drive force response of a load because, for example, the load response is relatively non-linear or unknown, not every drive force D(n), D(n+1), etc. necessarily needs to be updated for every pass of the load through the cycle of positions. Drive force changes are only needed when updating (i.e., correcting) positions. Skipping updates to drive functions for some or all positions in a cycle reduces some of the effects of cross-coupling between feedback loops. The drive function D(N,n) change is E(n)*(1/(1+sq.rt.R)) if position P(N,n) is being updated but position P(N,n−1) is not. The drive function D(N,n) change is E(n−1),(sq.rt.R/(1+sq.rt.R)) if position P(N,n−1) is being updated but position P(N,n) is not.

A less preferred drive method calculates or estimates a value of (sq.rt.) R for each position from the then-current drives, positions and drive-position low frequency transfer functions rather than from a "global" value. Rather than being a single global value for the entire drive cycle, R would be a variable with slightly different values at each position. This variable would be useful for driving very non-linear or variable damping actuators.

Thus, according to the present invention a given position error correction's effect on the succeeding position is compensated to detach loop closure towards each position from closure towards its predecessor and successor, enabling a drive Controller 54 with "n" parallel feedback loops no operate essentially independently. The more precisely the system conforms to the mathematical model (the above-mentioned second order differential equation or any improved equation),
a) the fewer cycles or iterations will be necessary to achieve a given lock accuracy;
b) the more independent the "n" feedback loops will be;
c) the faster the system will track changes in lock positions for a given lock precision and hence the more variation between patterns of positions in successive cycles C(N), C(N+1), etc. can be accommodated; and
d) the smaller random variations in lock accuracy will be.

Figure 21:
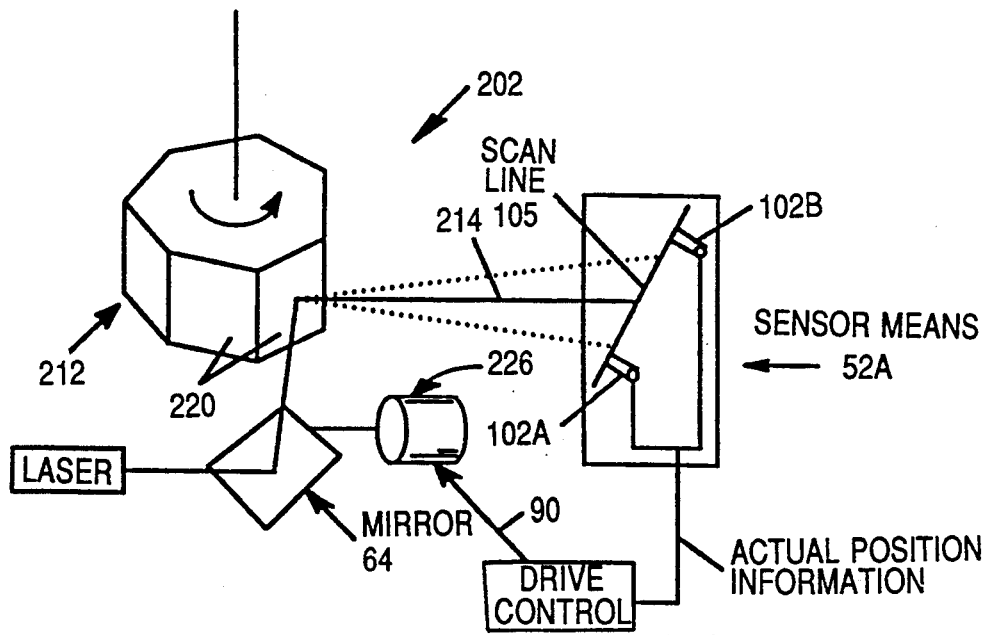
FIG. 21 is a schematic diagram illustrating how the drive means of FIG. 16 can be used to correct pyramidal angle deviations in a conventional polygonal mirror scanner used for scanning.

Referring to FIG. 21, in an otherwise conventional polygonal mirror scanner system 202, pyramidal angle deviations in facets 220 of the polygonal mirror 212 can be corrected by using a sensor means 52a (not necessarily the same as sensor 52) and drive control means 54 to hold mirror 64 in essentially constant (but actually compensated) positions as rotating polygonal mirror facets 220 reflect laser beam 214 along scan line 105 from point 102a to point 102b. Mirror 64 can be held in a "constant" position by drive control 54 through using identical values for adjacent positions P(n), P(n+1), etc. in the pattern. An optional second sensor 102b at the terminating end of scan line 105 allows locking both ends of the scan line to correct for astigmatism in the face of polygonal mirror 212. It would be within the spirit of the invention to use a beam splitter (not shown) to split beam 214 into a first portion continuing towards the plane containing sensor 102a and scan line 105, and a second portion deflected towards an auxiliary plane containing a film or other receiving means (not shown). This would allow using another optional sensor along the auxiliary plane for further corrections of astigmatism.

Actuator

Figure 22:
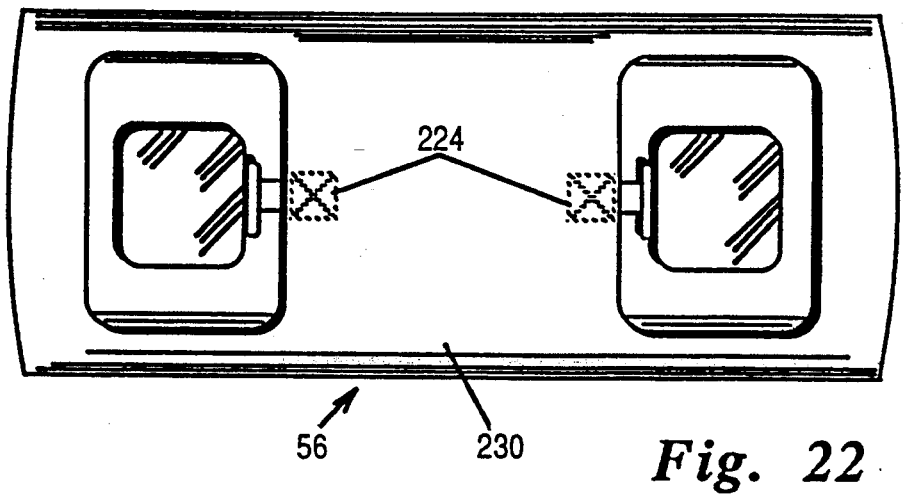
FIG. 22 is an exterior view of the preferred galvanometric actuator means.
Figure 23:
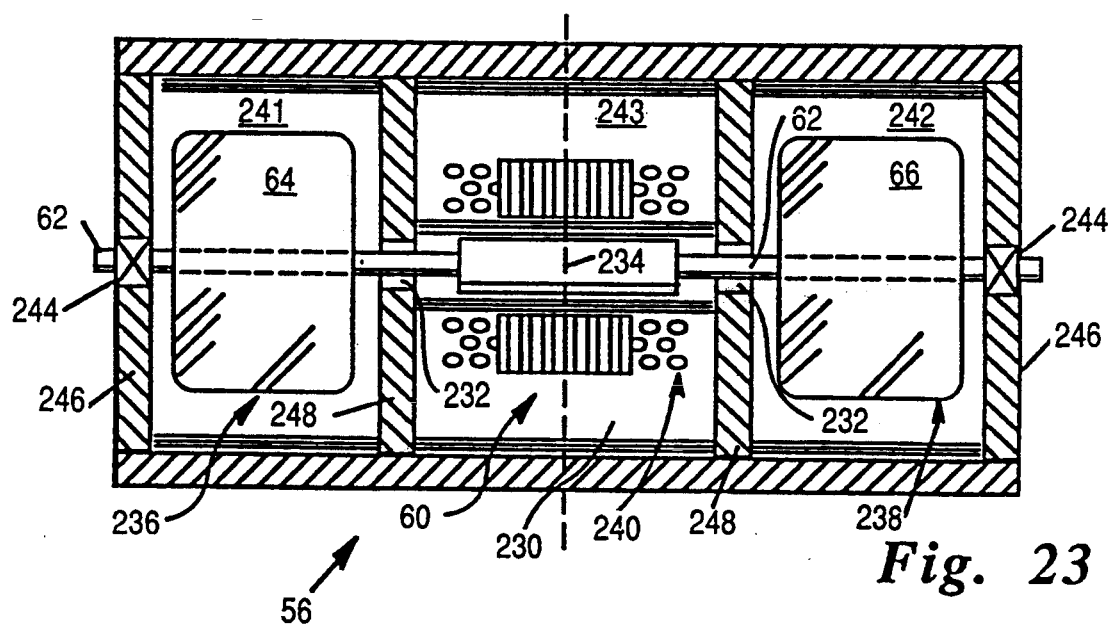
FIG. 23 is a cross-sectional view of the galvanometric actuator of FIG. 22.

Actuator means 56 as detailed in FIGS. 22 and 23 is preferably a galvanometric actuator comprising a housing 230 defining a central bore 232 for precisely receiving an armature 60. In contrast to prior art galvanometers, actuators according to the present invention have improved immunity to external vibrations and better performance by using an armature 60 formed from an elongated shaft 62 adapted to statically and dynamically balance around its center point 234 by having opposite ends 236 and 238 with equal masses.

Housing 230 defines a first compartment 241 at one end of bore 232 and a second compartment 242 at the opposite end of the bore. Armature shaft 62 is disposed within bore 232 and supported by "frictionless" drive return springs (preferably torsional flexure bearings) 244 with its longitudinally opposite ends 236 and 238 extending into first and second compartments 241 and 242 respectively, with its centers of mass and of support coinciding and also with its axes of symmetry and of rotation coinciding at point 234. Flexure bearings 244 are preferably disposed in end walls 246 of housing 230 as shown in FIG. 23 or could be disposed in interior walls 248 in housing 230 as indicated in FIG. 22. Drive return springs 244 oppose rotations of shaft 62 and urge the shaft back towards its rest position.

In the preferred embodiment, first mass 236 is a lightweight cavity reflector or mirror 64 which cooperates with laser means 58 and second mass 238 is a lightweight sensor reflector or mirror 66. The mirrors 64 and 66 do not necessarily need to be identical in size and weight as long as the masses of the mirrors and of shaft 62 balance armature 60 around its center of suspension 234. In alternate embodiments, the armature could use another balancing mass 238 instead of sensor mirror 66. Alternatively, either the frontside or backside (not shown) of cavity mirror 64 could be used as a sensor mirror.

Housing 230 may also define a middle (third) compartment 243 as shown in FIG. 23 for enclosing windings 240 which magnetically drive armature shaft 62, and may enclose some of the drive components such as amplifier 190 and D/A converter 188 which supplies drive force currents to actuator 56. Magnetic forces imparted to shaft 62 are preferably balanced about armature center point 234 to equalize torques opposing flexure bearings 244. Preferably, to provide highly repeatable responsiveness and higher resonant rates, galvanometer 56 uses stronger drive forces and supports 244 than do typical conventional galvanometers. Shaft 62 provides a rigid link insuring that cavity mirror 64 movements are faithfully duplicated by sensor mirror 66.

Figure 24:
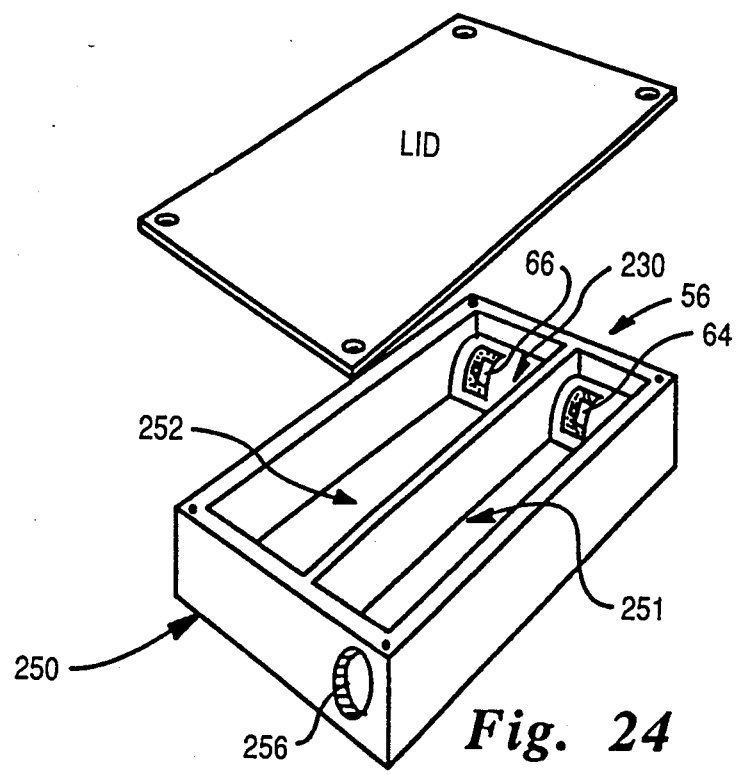
FIG. 24 is a perspective view of an optional casing for enclosing the sensor, drive and actuator of the present invention in an application as a wavelength agility unit.

Referring to FIG. 24, housing 230 may be disposed in a casing 250 with second compartment 242 opening into a chamber 252 which encloses light source 92 and optical detector means 98 of sensor means 52. An electronic processor 254 (FIG. 25) may also be enclosed in second chamber 252, which isolates sensor mirror 66 from interference by high optical and/or electro-magnetic (EMI) energy, and conversely from interfering with sensitive sensor components. First chamber 251 holds a temperature insensitive or compensated mounting (not shown) of a material such as Invar (R) or a glass substrate with a zero coefficient of thermal expansion for operation in a limited range of temperatures. The mounting in turn supports a diffraction grating 74, and holds a grating adjustment means (not shown) to precisely align the grating to a zero calibration. An opening 256 into first chamber 251 can be sealed to a laser gain cell port (conventionally a Brewster window) to form a cavity 72 as in FIG. 3. Alternative sealing arrangements can be used to confine an inert gas and to exclude ambient air and external dust.

System Operation

Referring to FIG. 25, in a system combining sensor 52 and drive control 54, a single computer such as a microprocessor as indicated by dashed-line box 254 embodies interpolating means 114, feedback means 192, error determining means 194, correction calculating means 196, and memory means 182. Drive memory 182 is preferably programmed with information defining the optimum timing delay relationships between positions of cavity mirror 64, desired wavelength pre-ionization pumping-of cavity 72, and firing trigger pulses on line 80 to laser 58. The interpolating means' desired position data source 146 is preferably the drive controller's desired position information memory 184.

The galvanometric actuator is normally operated in a mechanically resonant mode in which case the time to move the armature from one position to the next is half the resonant period. For example, if the inertial mass of armature 60 and the spring force of suspensors 244 together have a resonant oscillating frequency of 500 Hz, then the interval between stops is one millisecond.

Sensor means 52 provides interpolated actual position signals on line 88 through feedback means 192 to drive controller 54 which enable drive 54 to apply drive force currents through drive output line 90 to coils 240 of actuator means 56. This positions shaft to control the position of cavity mirror 64 as desired to reflect optical beam 78 at the proper angle to tune the frequency of output beam 82. A preprogrammed sequence of cavity mirror stopping positions "P" can be synchronized with laser pulses of either uniform or different wavelengths to permit pulsing laser 58 at very high rates and at peak power.

Figure 26:
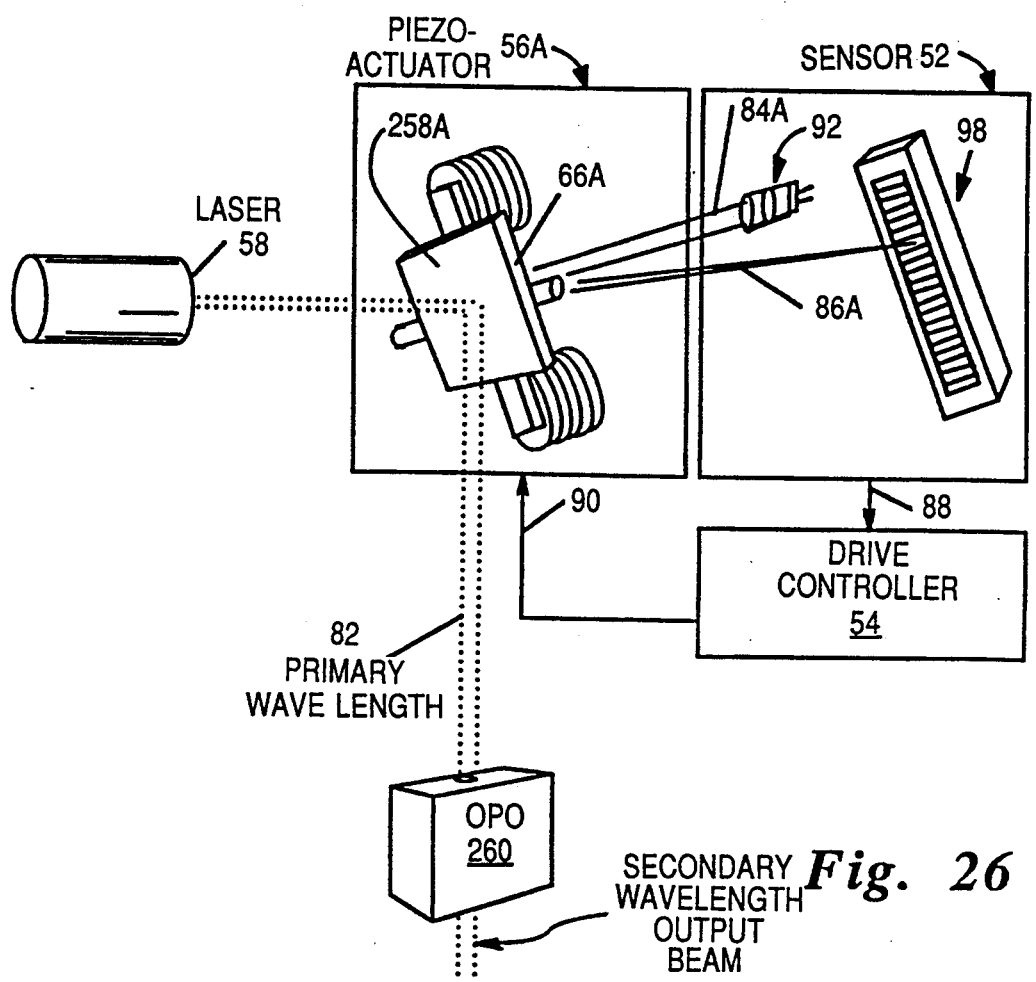
FIG. 26 is a diagram of a positioning system according to the present invention using an alternate piezoelectric type of actuator.

Preferred embodiments have been illustrated, of which modifications and adaptations within the scope of the invention will occur to those skilled in the art. Positions of a laser output beam steering mirror could be controlled by similarly using a sensor 52, a drive controller 54 and an actuator 56. For example, in FIG. 26 a piezo-electric type actuator 56a drives a mirror 258a, whose position is sensed from its backside 66a, to change the angle of impingement of a laser 58 output beam 82 on a non-linear (OPO) crystal 260. Alternatively, a diffraction grating (not shown) could be directly rotated without the need for a separate beam steering cavity mirror. The invention is limited only by the scope of the following claims.

I claim:

1. A method of selecting laser dual wavelengths comprising the steps of:
   (1) angularly moving a shaft of a galvanometric actuator by means of a drive control means providing a voltage to said galvanometric actuator which is selected from the group consisting of pulsed and alternating voltage, where angularly moving is selected from the group consisting of sinusoidally and resonantly moving;
   (2) using the drive control means in a resonant mode for moving the shaft in cycles at a fixed cyclic rate and causing the shaft to be motionless in two positions one hundred-eighty degrees of rotation apart for each cycle;
   (3) sensing the movement and angular position of the shaft by means of a sensor means comprising reflecting a continuously emitted sensing light beam onto a sensor reflector which is rigidly mounted on the acuator shaft, detecting the reflected beam by means of an optical detector, and using the position of the reflected beam for determining a position signal of the sensor reflector at the time in the cycle when the shaft is motionless;
   (4) controlling the drive control means for driving and positioning of the shaft by using feedback from the position signal;
   (5) directing a laser beam onto an intra-cavity reflector rigidly mounted on the actuator shaft, wherein the laser beam is created by a trigger pulse from the drive control means at the time when the intra-cavity reflector is motionless;
   (6) controlling the trigger pulse by means of the drive control means;
   (7) reflecting the laser beam off the intra-cavity reflector onto an optical diffraction grating;
   (8) selecting a specific wavelength of light by orienting the intra-cavity reflector relative to the diffraction grating and an axis of a laser cavity;
   (9) controlling the position of the intra-cavity reflector by means of the drive control means;
   (10) activating a change of state in a gain medium for the laser, by means of the drive control means;
   (11) controlling optimum energizing of the laser through timing information provided to the laser by feedback from the drive control means;
   (12) recording sensor reflector position information and programming sequential wavelength choices for the drive control means to implement the method by means of a memory means.

2. The method according to claim 1 wherein wavelengths result from the two motionless positions of the shaft, the wavelengths are selected at different wavelengths, generating two unique wavelengths at maximum laser power.

3. The method according to claim 1 wherein the sensor reflector and sensor means are mounted remote from the intra-cavity reflector, providing optical and electromagnetic shielding from the laser.

4. The method according to claim 1 wherein:
   (1) the intra-cavity reflector is an intra-cavity mirror;
   (2) the sensor reflector is a sensor mirror;
   (3) the intra-cavity mirror and the sensor mirror are of equal weight and are mounted at opposite ends of the actuator shaft, with their respective centers of mass equidistant from the center of the shaft;
   (4) the actuator shaft is symmetrically located and dynamically balanced;
   (5) the shaft is supported by torsional flexure bearings with uniform spring torsion characteristics.

5. The method according to claim 1 wherein the laser is a gas laser.

6. The method according to claim 1 wherein the laser is a solid state laser.

7. The method according to claim 6 wherein the solid state laser is an optical parametric oscillator.

8. The method according to claim 7 wherein the drive means is a piezo actuator.

9. The method according to claim 7 wherein the optical parametric oscillator is a non-linear crystal, and the laser wavelength emitted by said optical parametric oscillator is selected by directing a pump laser beam onto the intra-cavity reflector during an off-axis orientation position of said pump laser beam.

10. The method according to claim 9 wherein the non-linear crystal is Beta Barium Borate.

11. The method according to claim 1 wherein the sensor means used to determine the shaft position employs a charge coupled device.

12. The method according to claim 7 wherein interpolating is used in the sensor means for greater sensor accuracy.

13. A device for selecting laser dual wavelengths comprising:
   (1) an angularly moving galvanometric actuator shaft mounted in a housing where the angular movement is selected from the group consisting of sinusoidal and resonant movement;
   (2) a drive control means providing a voltage for angularly moving the actuator shaft, where the voltage is selected from the group consisting of pulsed and alternating voltage, driving the shaft in cycles at a fixed cyclic rate and causing the shaft to be motionless in two positions one hundred-eighty degrees of rotation apart for each cycle;
   (3) a sensor means for sensing the movement and angular position of the shaft comprising a means for reflecting a continuously emitted sensing light beam onto a sensor reflector which is rigidly mounted on the actuator shaft, detecting the reflected beam by means of an optical detector and using a position of the reflected beam for determining a position signal of the sensor reflector at the time in the cycle when the shaft is motionless;
   (4) the drive control means for driving and positioning of the shaft by using a feedback of the position signal;
   (5) an intra-cavity reflector, rigidly mounted on the actuator shaft, onto which a laser beam is directed, wherein the laser beam is created by a trigger pulse from the drive control means at the time when the intra-cavity reflector is motionless;
   (6) the drive control means for controlling the trigger pulse;
   (7) an optical diffraction grating onto which the reflected laser beam is directed, the specific wavelength is selected by orienting the intra-cavity reflector relative to the diffraction grating and an axis of a laser cavity;
   (8) the drive control means for controlling the position of the intra-cavity reflector;
   (9) the drive control means for activating a change of state in a gain medium for the laser;
   (10) electronic timing in the drive control means to control optimum energizing by utilizing the feedback from the control means;
   (11) a memory means for recording sensor reflector position information and for programming sequential wavelength choices for the drive control to implement.

14. The device according to claim 13 wherein wavelengths result from the two motionless positions of the shaft, the wavelengths are selected at different wavelengths, generating two unique wavelengths at maximum laser power.

15. The device according to claim 13 wherein the sensor reflector and sensor means are mounted remote from the intra-cavity reflector, providing optical and electromagnetic shielding from the laser.

16. The device according to claim 13 wherein:
   (1) the intra-cavity reflector is an intra-cavity mirror;
   (2) the sensor reflector is a sensor mirror;
   (3) the intra-cavity mirror and the sensor mirror are of equal weight and are mounted at opposite ends of the actuator shaft, with their respective centers of mass equidistant from the center of the shaft;
   (4) the actuator shaft is symmetrically located and dynamically balanced;
   (5) the shaft is supported by torsional flexure bearings with uniform spring torsion characteristics.

17. The device according to claim 13 wherein the laser is a gas laser.

18. The device according to claim 13 wherein the laser is a solid state laser.

19. The device according to claim 18 wherein the solid state laser is an optical parametric oscillator.

20. The device according to claim 19 wherein the drive means is a piezo actuator.

21. The device according to claim 19 wherein the optical parametric oscillator is a non-linear crystal, and the laser wavelength emitted by said optical parametric oscillator is selected by directing a pump laser beam onto the intra-cavity reflector during an off-axis orientation position of said pump laser beam.

22. The device according to claim 21 wherein the non-linear crystal is Beta Barium Borate.

23. The device according to claim 13 wherein the sensor means used to determine the shaft position employs a charge coupled device.

24. The device according to claim 23 wherein interpolation is used in the sensor means for greater sensor accuracy.

* * * * *